(12) United States Patent
Yang et al.

(10) Patent No.: US 12,177,580 B2
(45) Date of Patent: Dec. 24, 2024

(54) IMAGE PROCESSING METHOD, CAMERA ASSEMBLY AND MOBILE TERMINAL

(71) Applicant: GUANGDONG OPPO MOBILE TELECOMMUNICATIONS CORP., LTD., Guangdong (CN)

(72) Inventors: Xin Yang, Guangdong (CN); Xiaotao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 119 days.

(21) Appl. No.: 18/135,063

(22) Filed: Apr. 14, 2023

(65) Prior Publication Data
US 2023/0269496 A1    Aug. 24, 2023

Related U.S. Application Data

(63) Continuation of application No. PCT/CN2020/130139, filed on Nov. 19, 2020.

(30) Foreign Application Priority Data

Oct. 26, 2020   (CN) .......................... 202011154432.X

(51) Int. Cl.
*H04N 23/84*     (2023.01)
*G06T 5/20*      (2006.01)
(Continued)

(52) U.S. Cl.
CPC ............ *H04N 23/843* (2023.01); *G06T 5/20* (2013.01); *G06T 5/50* (2013.01); *H04N 23/81* (2023.01);
(Continued)

(58) Field of Classification Search
CPC ...... H04N 23/843; H04N 23/81; H04N 25/10; H04N 23/73; H04N 23/80; H04N 25/11;
(Continued)

(56) References Cited

U.S. PATENT DOCUMENTS 8,130,317 B2 *  3/2012  Li ........................... H04N 23/84
                                                     345/604
11,758,289 B2 *  9/2023  Yang ..................... H04N 23/84
(Continued)

FOREIGN PATENT DOCUMENTS

CN       101233763 A     7/2008
CN       102484721 A     5/2012
(Continued)

OTHER PUBLICATIONS

European Search Report from the corresponding European Patent Application No. 20959471.2, mailed Feb. 28, 2024.
(Continued)

*Primary Examiner* — Marly S Camargo
(74) *Attorney, Agent, or Firm* — Ladas & Parry, LLP

(57) ABSTRACT

An image processing method, a camera assembly and a mobile terminal. The image processing method includes: obtaining a Bayer image and a panchromatic image, obtaining an RGB image after processing the Bayer image with a first processing algorithm and a demosaicing algorithm, obtaining a luminance image after processing the panchromatic image with the first processing algorithm, obtaining a fused RGB image by fusing the RGB image and the luminance image, and obtaining a YUV image after processing the fused RGB image with a second processing algorithm.

20 Claims, 16 Drawing Sheets

(51) Int. Cl.
  *G06T 5/50* (2006.01)
  *H04N 23/81* (2023.01)
  *H04N 25/10* (2023.01)
(52) U.S. Cl.
  CPC ... *H04N 25/10* (2023.01); *G06T 2207/10024* (2013.01); *G06T 2207/20221* (2013.01)
(58) Field of Classification Search
  CPC .......... H04N 25/133; G06T 5/20; G06T 5/50; G06T 2207/10024; G06T 2207/20221
  See application file for complete search history.

(56) References Cited

U.S. PATENT DOCUMENTS

| | | | | |
|---|---|---|---|---|
| 2006/0222260 | A1* | 10/2006 | Sambongi | G06T 5/50 382/274 |
| 2008/0068477 | A1 | 3/2008 | Iida et al. | |
| 2008/0130991 | A1* | 6/2008 | O'Brien | H04N 23/16 382/67 |
| 2008/0218597 | A1 | 9/2008 | Cho | |
| 2022/0336508 | A1* | 10/2022 | Tang | H04N 25/534 |
| 2023/0334818 | A1* | 10/2023 | Yang | G06V 10/56 |

FOREIGN PATENT DOCUMENTS

| | | |
|---|---|---|
| CN | 104170376 A | 11/2014 |
| CN | 105430361 A | 3/2016 |
| CN | 107360342 A | 11/2017 |
| CN | 107924554 A | 4/2018 |
| CN | 110493583 A | 11/2019 |
| CN | 111246064 A | 6/2020 |
| CN | 111294493 A | 6/2020 |
| CN | 111314592 A | 6/2020 |
| CN | 111447380 A | 7/2020 |
| CN | 111711755 A | 9/2020 |
| CN | 111741221 A | 10/2020 |
| CN | 111741277 * | 10/2020 ............. H04N 23/84 |
| CN | 111741277 A | 10/2020 |
| CN | 111757006 A | 10/2020 |
| JP | 2008078922 A | 4/2008 |

OTHER PUBLICATIONS

First Office Action and search report dated May 25, 2021 for Chinese Application No. 202011154432.X and its English translation provided by applicant's foreign counsel.
Second Office Action and search report dated Aug. 9, 2021 for Chinese Application No. 202011154432.X and its English translation provided by applicant's foreign counsel.
International Search Report(ISR) dated Jul. 30, 2021 for Application No. PCT/CN2020/130139 and its English translation provided by WIPO.
Written Opinion (WOSA) dated Jul. 30, 2021 for Application No. PCT/CN2020/130139 and its English translation provided by WIPO.

* cited by examiner obtaining a Bayer image and a panchromatic image; where the Bayer image includes multiple first image pixels, a pixel value of each first image pixel being generated by the at least one light-sensitive pixel in a corresponding subunit, the first image pixels being arranged in a Bayer array; the panchromatic image includes multiple second image pixels, a pixel value of each second image pixel being generated by the at least one panchromatic light-sensitive pixel in a corresponding subunit obtaining an RGB image after processing the Bayer image with a first processing algorithm and a demosaicing algorithm obtaining a luminance image after processing the panchromatic image with the first processing algorithm obtaining a fused RGB image by fusing the RGB image and the luminance image obtaining a YUV image after processing the fused RGB image with a second processing algorithm

FIG. 16

01 — obtaining a Bayer image and a panchromatic image; where the Bayer image includes multiple first image pixels, a pixel value of each first image pixel being generated by the at least one light-sensitive pixel in a corresponding subunit, the first image pixels being arranged in a Bayer array; the panchromatic image includes multiple second image pixels, a pixel value of each second image pixel being generated by the at least one panchromatic light-sensitive pixel in a corresponding subunit 02 — obtaining an RGB image after processing the Bayer image with a first processing algorithm and a demosaicing algorithm 03 — obtaining a luminance image after processing the panchromatic image with the first processing algorithm 04 — obtaining a fused RGB image by fusing the RGB image and the luminance image 05 — obtaining a YUV image after processing the fused RGB image with a second processing algorithm 06 — performing image post-processing on the YUV image

FIG. 23 obtaining a Bayer image and a panchromatic image; where the Bayer image includes multiple first image pixels, a pixel value of each first image pixel being generated by the at least one light-sensitive pixel in a corresponding subunit, the first image pixels being arranged in a Bayer array; the panchromatic image includes multiple second image pixels, a pixel value of each second image pixel being generated by the at least one panchromatic light-sensitive pixel in a corresponding subunit — 01 obtaining an RGB image after processing the Bayer image with a first processing algorithm and a demosaicing algorithm — 02 obtaining a luminance image after processing the panchromatic image with the first processing algorithm — 03 obtaining a fused RGB image by fusing the RGB image and the luminance image — 04 obtaining a YUV image after processing the fused RGB image with a second processing algorithm — 05 storing the RGB image, the luminance image, and the fused RGB image — 07

FIG. 25

IMAGE PROCESSING METHOD, CAMERA ASSEMBLY AND MOBILE TERMINAL

CROSS REFERENCE

The present disclosure is a continuation-application of International (PCT) Patent Application No. PCT/CN2020/130139, filed on Nov. 19, 2020, which claims priority of Chinese Patent Application No. 202011154432.X, filed on Oct. 26, 2020, the entire contents of which are hereby incorporated by reference in their entirety.

TECHNICAL FIELD

The present disclosure relates to the field of imaging technologies, and in particular to an image processing method, a camera assembly, and a mobile terminal.

BACKGROUND

Mobile phones and other electronic devices are often equipped with a camera to take pictures. The camera is arranged with an image sensor. In order to capture color images, a filter array in the form of Bayer arrays is usually arranged in the image sensor, such that multiple pixels in the image sensor can receive light passing through corresponding filters to generate pixel signals with different color channels.

SUMMARY OF THE DISCLOSURE

The present disclosure provides an image processing method, a camera assembly, and a mobile terminal.

An image processing method applied to an image sensor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel; the method comprises: obtaining a Bayer image and a panchromatic image; wherein the Bayer image comprises a plurality of first image pixels, a pixel value of each first image pixel being generated by the at least one light-sensitive pixel in a corresponding subunit, the plurality of first image pixels being arranged in a Bayer array; the panchromatic image comprises a plurality of second image pixels, a pixel value of each second image pixel being generated by the at least one panchromatic light-sensitive pixel in a corresponding subunit; obtaining an RGB image after processing the Bayer image with a first processing algorithm and a demosaicing algorithm; obtaining a luminance image after processing the panchromatic image with the first processing algorithm; obtaining a fused RGB image by fusing the RGB image and the luminance image; and obtaining a YUV image after processing the fused RGB image with a second processing algorithm.

A camera assembly, comprising an image sensor and a processor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel; wherein the processor is configured to perform an image processing method comprising: obtaining a Bayer image and a panchromatic image; wherein the Bayer image comprises a plurality of first image pixels, a pixel value of each first image pixel being generated by the at least one light-sensitive pixel in a corresponding subunit, the plurality of first image pixels being arranged in a Bayer array; the panchromatic image comprises a plurality of second image pixels, a pixel value of each second image pixel being generated by the at least one panchromatic light-sensitive pixel in a corresponding subunit; obtaining an RGB image after processing the Bayer image with a first processing algorithm and a demosaicing algorithm; obtaining a luminance image after processing the panchromatic image with the first processing algorithm; obtaining a fused RGB image by fusing the RGB image and the luminance image; and obtaining a YUV image after processing the fused RGB image with a second processing algorithm.

A mobile terminal, comprising: a camera assembly; and a housing, wherein the camera assembly is arranged on the housing. The camera assembly comprises an image sensor and a processor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel; wherein the processor is configured to perform an image processing method comprising: obtaining a Bayer image and a panchromatic image; wherein the Bayer image comprises a plurality of first image pixels, a pixel value of each first image pixel being generated by the at least one light-sensitive pixel in a corresponding subunit, the plurality of first image pixels being arranged in a Bayer array; the panchromatic image comprises a plurality of second image pixels, a pixel value of each second image pixel being generated by the at least one panchromatic light-sensitive pixel in a corresponding subunit; obtaining an RGB image after processing the Bayer image with a first processing algorithm and a demosaicing algorithm; obtaining a luminance image after processing the panchromatic image with the first processing algorithm; obtaining a fused RGB image by fusing the RGB image and the luminance image; and obtaining a YUV image after processing the fused RGB image with a second processing algorithm.

Additional aspects and advantages of the embodiments of the present disclosure will be given in part in the following description, and will become apparent in part from the following description, or by the practice of the present disclosure.

BRIEF DESCRIPTION OF THE DRAWINGS

The foregoing and/or additional aspects and advantages of the present disclosure will become apparent and easily understood from the description of the embodiments in conjunction with the accompanying drawings below.

FIG. 16 is a flowchart of an image processing method according to an embodiment of the present disclosure.

FIG. 21 is a principle schematic view of an image processing method according to another embodiment of the present disclosure.

FIG. 25 is a flowchart of an image processing method according to an embodiment of the present disclosure.

DETAILED DESCRIPTION

Embodiments of the present disclosure are described in detail below, and examples of the embodiments are shown in the accompanying drawings, where same or similar designation indicates same or similar element or an element having same or similar function. The embodiments described below by reference to the accompanying drawings are exemplary and are intended only to explain the embodiments of the present disclosure and are not to be construed as limiting the embodiments of the present disclosure.

In the related art, mobile phones and other electronic devices are often equipped with a camera to take pictures. The camera is arranged with an image sensor. In order to capture color images, a filter array in the form of Bayer arrays is usually arranged in the image sensor, such that multiple pixels in the image sensor can receive light passing through corresponding filters to generate pixel signals with different color channels. The image from Bayer array will have the problem of loss of sharpness after demosaicing.

Figure 1:
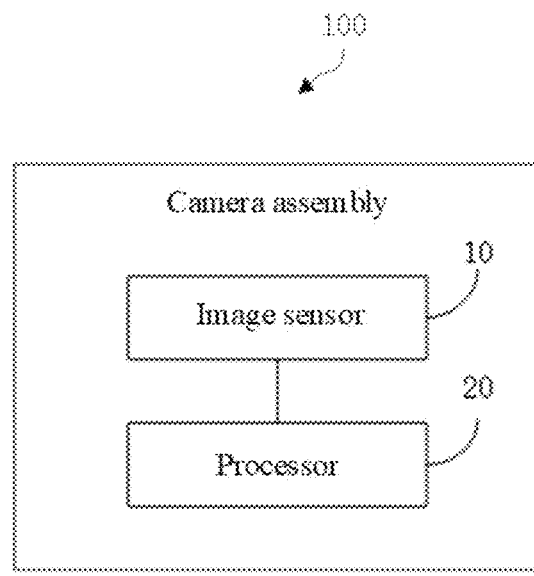
FIG. 1 is a schematic view of a camera assembly according to an embodiment of the present disclosure.
Figure 2:
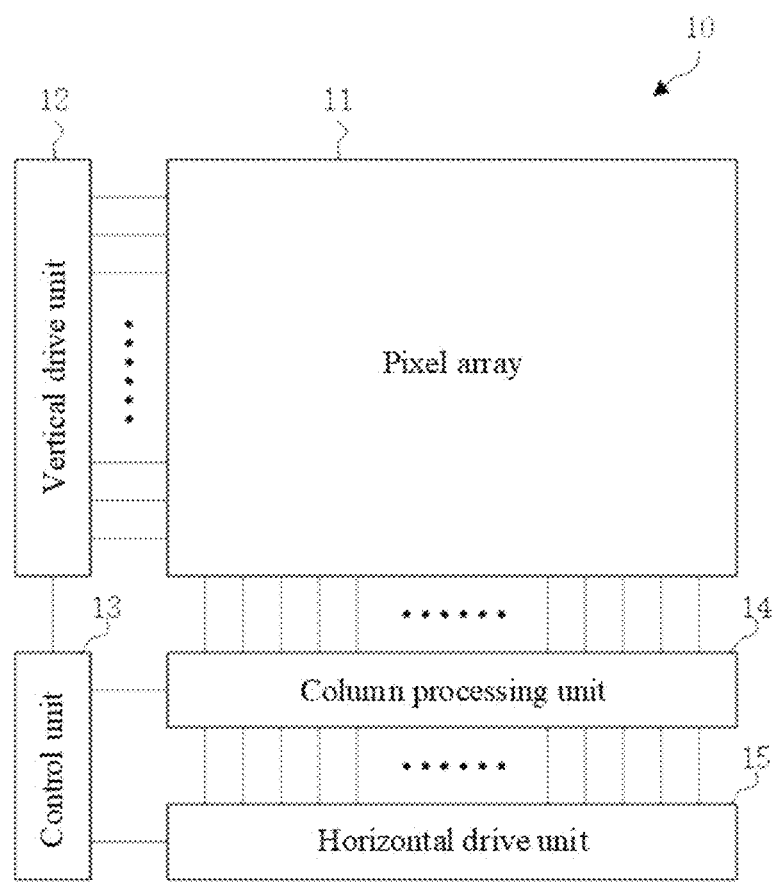
FIG. 2 is a schematic view of a pixel array according to an embodiment of the present disclosure.
Figure 5:
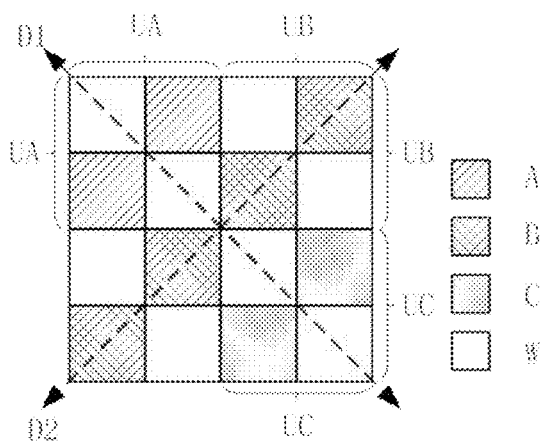
FIG. 5 is a schematic view of an arrangement of a smallest repeating unit in a pixel array according to an embodiment of the present disclosure.

For the foregoing reasons, referring to FIGS. 1, 2 and 5, the present disclosure provides a camera assembly 100. The camera assembly 100 includes an image sensor 10 and a processor 20. The image sensor 10 includes a pixel array 11, and the pixel array 11 includes multiple subunits, each subunit including at least one panchromatic light-sensitive pixel W and at least one color light-sensitive pixel; each color light-sensitive pixel has a narrower spectral response than each panchromatic light-sensitive pixel W. The pixel array 11 is exposed to obtain a Bayer image and a panchromatic image; the Bayer image includes multiple first image pixels, a pixel value of each first image pixel being generated by the at least one light-sensitive pixel in a corresponding subunit, the first image pixels being arranged in a Bayer array; the panchromatic image includes multiple second image pixels, a pixel value of each second image pixel being generated by the at least one panchromatic light-sensitive pixel W in a corresponding subunit. The processor 20 is electrically connected to the image sensor 10. The processor 20 is configured to obtain an RGB image after processing the Bayer image with a first processing algorithm and a demosaicing algorithm; to obtain a luminance image after processing the panchromatic image with the first processing algorithm; to obtain a fused RGB image by fusing the RGB image and the luminance image; and to obtain a YUV image after processing the fused RGB image with a second processing algorithm. The processor 20 may refer to an image signal processor (ISP).

The camera assembly 100 of the present embodiments obtains a Bayer image and a panchromatic image by exposing the pixel array 11, processes the Bayer image and the panchromatic image to obtain an RGB image and a luminance image, and fuses the luminance image with the RGB image, which can improve the signal-to-noise ratio of the fused RGB image, which results in a higher definition of the image.

The camera assembly 100 of the present embodiments is described in detail below in conjunction with the accompanying drawings.

Referring to FIG. 2, the image sensor 10 includes a pixel array 11, a vertical drive unit 12, a control unit 13, a column processing unit 14, and a horizontal drive unit 15.

For example, the image sensor 10 may be adopted with a complementary metal oxide semiconductor (CMOS) sensor or a charge-coupled device (CCD) sensor.

Figure 3:
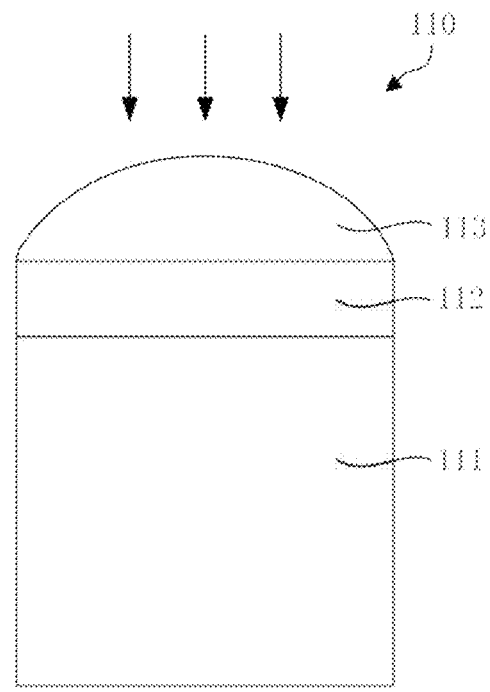
FIG. 3 is a cross-sectional schematic view of a light-sensitive pixel according to an embodiment of the present disclosure.
Figure 4:
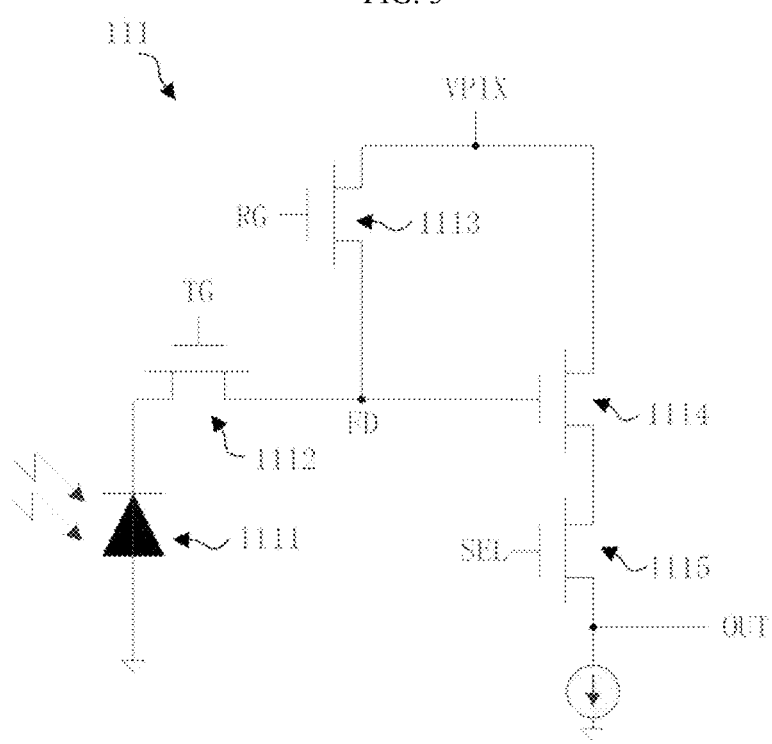
FIG. 4 is a pixel circuit diagram of a light-sensitive pixel according to an embodiment of the present disclosure.

For example, the pixel array 11 includes multiple light-sensitive pixels 110 (shown in FIG. 3) arranged in two dimensions in an array (i.e., arranged in a two-dimensional matrix), and each light-sensitive pixel 110 includes a photoelectric conversion element 1111 (shown in FIG. 4). Each light-sensitive pixel 110 converts light to electrical charge based on the intensity of the light incident on it.

For example, the vertical drive unit 12 includes a shift register and an address decoder. The vertical drive unit 12 includes a read-out scan and a reset scan function. The read-out scan is a sequential line-by-line scan of the unit light-sensitive pixels 110 from which signals are read line-by-line. For example, the signal output from each light-sensitive pixel 110 in a selected and scanned light-sensitive pixel row is transmitted to the column processing unit 14. The reset scan is to reset the electrical charge, and the photoelectric charge of the photoelectric conversion element 1111 is discarded such that the accumulation of a new photoelectric charge can be started.

For example, the signal processing performed by the column processing unit 14 is a correlated double sampling (CDS) processing. In the CDS processing, a reset level and a signal level output from each light-sensitive pixel 110 in the selected light-sensitive pixel row are taken, and a level difference is calculated and obtained. In this way, the signals of the light-sensitive pixels 110 in a row are obtained. The column processing unit 14 may have an analog-to-digital (A/D) conversion function for converting analog pixel signals to digital format.

For example, the horizontal drive unit 15 includes a shift register and an address decoder. The horizontal drive unit 15 sequentially scans the pixel array 11 column-by-column, and each light-sensitive pixel column is sequentially processed by the column processing unit 14 and sequentially output by the selective scanning operation performed by the horizontal drive unit 15.

For example, the control unit 13 configures timing signals according to an operation mode and controls the vertical drive unit 12, the column processing unit 14, and the horizontal drive unit 15 with the multiple timing signals to work together.

Referring to FIG. 3, the light-sensitive pixel 110 includes a pixel circuit 111, a filter 112, and a microlens 113. The microlens 113, the filter 112, and the pixel circuit 111 are disposed sequentially along a light-receiving direction of the light-sensitive pixel 110. The microlens 113 is configured to converge light, and the filter 112 is configured to pass light in a certain band and filter out light in the rest of the band. The pixel circuit 111 is configured to convert the received light into an electrical signal and provide a generated electrical signal to the column processing unit 14 shown in FIG. 2.

Referring to FIG. 4, the pixel circuit 111 may be applied to each light-sensitive pixel 110 (shown in FIG. 3) within the pixel array 11 shown in FIG. 2. The operation of the pixel circuit 111 is described below in connection with FIGS. 2-4.

Referring to FIG. 4, the pixel circuit 111 includes a photoelectric conversion element 1111 (e.g., a photodiode), an exposure control circuit (e.g., a transfer transistor 1112), a reset circuit (e.g., a reset transistor 1113), an amplification circuit (e.g., an amplification transistor 1114), and a selection circuit (e.g., a selection transistor 1115). In the embodiments of the present disclosure, the transfer transistor 1112, the reset transistor 1113, the amplification transistor 1114, and the selection transistor 1115 are, for example, MOS tubes, without limitation herein.

For example, the photoelectric conversion element 1111 includes a photodiode, with an anode of the photodiode connected to ground, for example. The photodiode converts the received light into an electrical charge. A cathode of the photodiode is connected to a floating diffusion (FD) unit through the exposure control circuit (e.g., transfer transistor 1112). The FD unit is connected to a gate of the amplification transistor 1114, and a source of the reset transistor 1113.

For example, the exposure control circuit is the transfer transistor 1112, and a control terminal (TG) of the exposure control circuit is a gate of the transfer transistor 1112. The transfer transistor 1112 is on when a pulse of an effective level (e.g., VPIX level) is transmitted to the gate of the transfer transistor 1112 through an exposure control line. The transfer transistor 1112 transfers the charge photoelectric-converted by the photodiode to the FD unit.

For example, a drain of the reset transistor 1113 is connected to a pixel power supply VPIX. The source of the reset transistor 113 is connected to the FD unit. Before the charge is transferred from the photodiode to the FD unit, the pulse of the effective reset level is transmitted to the gate of the reset transistor 113 through the reset line and the reset transistor 113 is on. The reset transistor 113 resets the FD unit to the pixel power supply VPIX.

For example, a gate of the amplification transistor 1114 is connected to the FD unit, and a drain of the amplification transistor 1114 is connected to the pixel power supply VPIX. After the FD unit is reset by the reset transistor 1113, the amplification transistor 1114 outputs a reset level through an output OUT via the selection transistor 1115. After the charge of the photodiode is transferred by the transfer transistor 1112, the amplification transistor 1114 outputs a signal level via the selection transistor 1115 through the output OUT.

For example, a drain of the selection transistor 1115 is connected to a source of the amplification transistor 1114. A source of the selection transistor 1115 is connected to the column processing unit 14 in FIG. 2 through the output OUT. The selection transistor 1115 is on when an effective level pulse is transmitted to a gate of the selection transistor 1115 through a selection line. The signal output from the amplification transistor 1114 is transmitted to column processing unit 14 through selection transistor 1115.

It is noted that the pixel structure of the pixel circuit 111 in the present disclosure is not limited to the structure shown in FIG. 4. For example, the pixel circuit 111 may have a three-transistor pixel structure in which the functions of the amplification transistor 1114 and the selection transistor 1115 are performed by a single transistor. For example, the exposure control circuit is not limited to the way of a single transfer transistor 1112, other electronic devices or structures having the function of controlling conduction at the control terminal can be used as the exposure control circuit in the present disclosure t, and the implementation of the single transfer transistor 1112 in in the present disclosure is simple, low cost, and easy to control.

Referring to FIGS. 5-15, FIGS. 5-15 are schematic views of arrangement of the light-sensitive pixels 110 (as shown in FIG. 3) in the pixel array 110 (as shown in FIG. 2) according to embodiments of the present disclosure. The light-sensitive pixels 110 include two types, panchromatic light-sensitive pixel W and color light-sensitive pixel. The pixel array 11 includes multiple smallest repeating units, each smallest repeating unit including multiple subunits. FIGS. 5-15 show only the arrangement of multiple light-sensitive pixels 110 in a smallest repeating unit consisting of four subunits, and in other examples, the number of subunits in each smallest repeating unit may also be two, three, five, ten, etc., without limitation herein. The smallest repeating unit consisting of four subunits shown in FIGS. 5-17 is replicated multiple times in rows and columns to form the pixel array 11. Each subunit includes at least one panchromatic light-sensitive pixel W and at least one color light-sensitive pixel. In each subunit, the panchromatic light-sensitive pixel W and the color light-sensitive pixel may be alternately arranged; or, in each subunit, multiple light-sensitive pixels 110 in the same row may have the same color channel; or, in each subunit, multiple light-sensitive pixels 110 in the same column may have the same color channel; or, in each smallest repeating unit, multiple light-sensitive pixels 110 in the same row and having the same color channel and multiple light-sensitive pixels 110 in the same column and having the same color channel may be alternately arranged; or, in each subunit, when the number of panchromatic light-sensitive pixel W is one and the number of the color light-sensitive pixels is multiple, the panchromatic light-sensitive pixels W may be disposed at any position in the subunit; or, in each subunit, when the number of the panchromatic light-sensitive pixels W is multiple and the number of color-sensitive pixel is one, the color-sensitive pixel may be disposed at any position in the subunit.

Specifically, for example, FIG. 5 is a schematic view of an arrangement of the light-sensitive pixels 110 (shown in FIG. 3) in a smallest repeating unit according to an embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| W | A | W | B |
|---|---|---|---|
| A | W | B | W |
| W | B | W | C |
| B | W | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 5, for each subunit, the panchromatic light-sensitive pixels W and light-sensitive pixels are arranged alternately.

As shown in FIG. 5, the subunits include three categories. A first category subunit UA includes multiple panchromatic light-sensitive pixels W and multiple first color light-sensitive pixels A; a second category subunit UB includes multiple panchromatic light-sensitive pixels W and multiple second color light-sensitive pixels B; and a third category subunit UC includes multiple panchromatic light-sensitive pixels W and multiple third color light-sensitive pixels C. Each smallest repeating unit includes four subunits, one first category subunit UA, two second category subunits UB, and one third category subunit UC, respectively; where the first category subunit UA and the third category subunit UC are arranged in a first diagonal direction D1 (e.g., a direction connecting the upper left and lower right corners in FIG. 5), and the two second category subunits UB are arranged in a second diagonal direction D2 (e.g., a direction connecting the upper right and lower left corners in FIG. 5). The first diagonal direction D1 is different from the second diagonal direction D2. For example, the first diagonal direction D1 and the second diagonal direction D2 are perpendicular to each other.

It should be noted that in other embodiments, the first diagonal direction D1 may be a direction connecting the upper right and lower left corners, and the second diagonal direction D2 may be a direction connecting the upper left and lower right corners. In addition, the "direction" here is not unidirectional, but may be understood as the concept of a "straight line" indicating the arrangement, which can have both ends of the line pointing in both directions. The explanation of the first diagonal direction D1 and the second diagonal direction D2 in FIGS. 6-10 below is the same as here.

Figure 6:
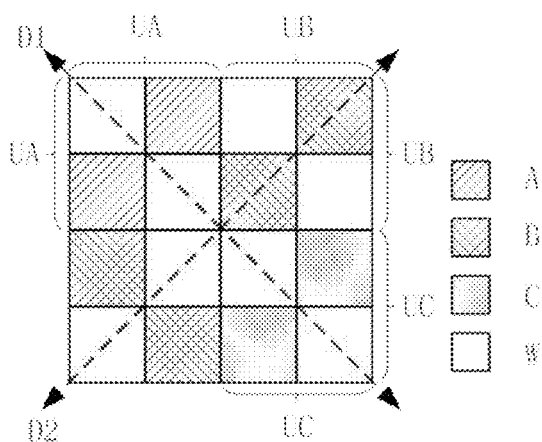
FIG. 6 is a schematic view of an arrangement of a smallest repeating unit in a pixel array according to another embodiment of the present disclosure.

For example, FIG. 6 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| W | A | W | B |
|---|---|---|---|
| A | W | B | W |
| B | W | W | C |
| W | B | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

The arrangement of the light-sensitive pixels 110 in the smallest repeating unit shown in FIG. 6 is approximately the same as that of the light-sensitive pixels 110 in the smallest repeating unit shown in FIG. 5, except that the alternating order of the panchromatic light-sensitive pixels W and the single-color light-sensitive pixels in the second category subunit UB disposed in the lower left corner of FIG. 6 is different from the alternating order of the panchromatic light-sensitive pixels W and the single-color light-sensitive pixels in the second category subunit UB disposed in the lower left corner of FIG. 5. Specifically, in the second category subunit UB disposed in the lower left corner of FIG. 5, the alternating order of the light-sensitive pixels 110 in the first row is panchromatic light-sensitive pixel W, color light-sensitive pixel (i.e., second color light-sensitive pixel B), and the alternating order of the light-sensitive pixels 110 in the second row is color light-sensitive pixel (i.e., second color light-sensitive pixel B), panchromatic light-sensitive pixel W. In the second category subunit UB disposed in the lower left corner of FIG. 6, the alternating order of the light-sensitive pixels 110 in the first row is color light-sensitive pixel (i.e., second color light-sensitive pixel B), panchromatic light-sensitive pixel W, and the alternating order of the light-sensitive pixels 110 in the second row is panchromatic light-sensitive pixel W, color light-sensitive pixel (i.e., second color-sensitive pixel B).

As shown in FIG. 6, the alternating order of the panchromatic light-sensitive pixels W and the single-color light-sensitive pixels in the first category subunit UA and the third category subunit UC in FIG. 6 is not the same as the alternating order of the panchromatic light-sensitive pixels W and the color light-sensitive pixels in the second category subunit UB disposed in the lower left corner. Specifically, in the first category subunit UA and the third category subunit UC shown in FIG. 6, the alternating order of the light-sensitive pixels 110 in the first row is panchromatic light-sensitive pixel W, color light-sensitive pixel, and the alternating order of the light-sensitive pixels 110 in the second row is color light-sensitive pixel, panchromatic light-sensitive pixel W; while in the second category subunit UB shown in FIG. 6, disposed in the lower left corner, the alternating order of the light-sensitive pixels 110 in the first row is color light-sensitive pixel (i.e., third color light-sensitive pixel B), panchromatic light-sensitive pixel W, and the alternating order of photosensitive pixels 110 in the second row is panchromatic light-sensitive pixel W, color light-sensitive pixel (i.e., third color light-sensitive pixel B).

Therefore, according to FIG. 5 and FIG. 6, the alternating order of the panchromatic light-sensitive pixels W and color light-sensitive pixels within different subunits in the same smallest repeating unit may be consistent (as shown in FIG. 5) or inconsistent (as shown in FIG. 6).

Figure 7:
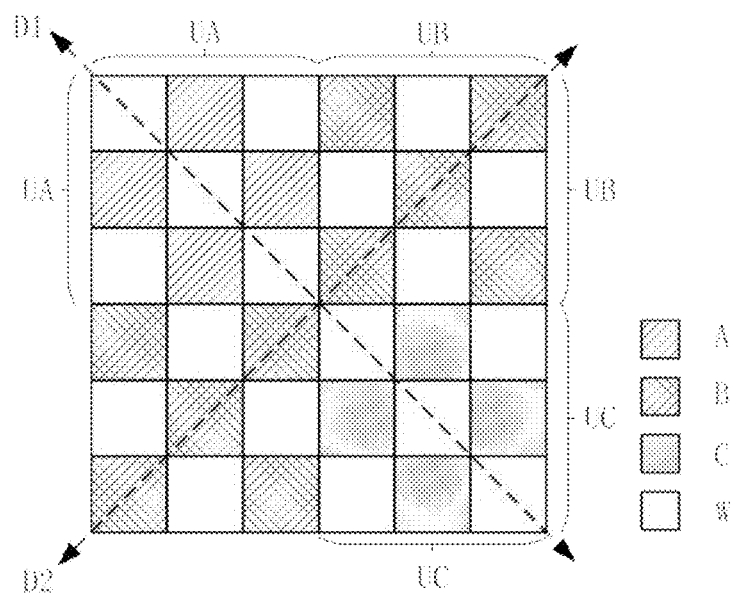
FIG. 7 is a schematic view of an arrangement of a smallest repeating unit in a pixel array according to further another embodiment of the present disclosure.

For example, FIG. 7 is a schematic view of an arrangement of the light-sensitive pixels 110 (shown in FIG. 3) in a smallest repeating unit according to another embodiment of the present disclosure. The smallest repeating unit includes 36 light-sensitive pixels 110 in 6 rows and 6 columns, and each subunit includes 9 light-sensitive pixels 110 in 3 rows and 3 columns. The arrangement is as follows.

| W | A | W | B | W | B |
|---|---|---|---|---|---|
| A | W | A | W | B | W |
| W | A | W | B | W | B |
| B | W | B | W | C | W |
| W | B | W | C | W | C |
| B | W | B | W | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 7, for each subunit, the panchromatic light-sensitive pixels W and light-sensitive pixels are arranged alternately.

As shown in FIG. 7, the subunits include three categories. A first category subunit UA includes multiple panchromatic light-sensitive pixels W and multiple first color light-sensitive pixels A; a second category subunit UB includes multiple panchromatic light-sensitive pixels W and multiple second color light-sensitive pixels B; and a third category subunit UC includes multiple panchromatic light-sensitive pixels W and multiple third color light-sensitive pixels C. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 8:
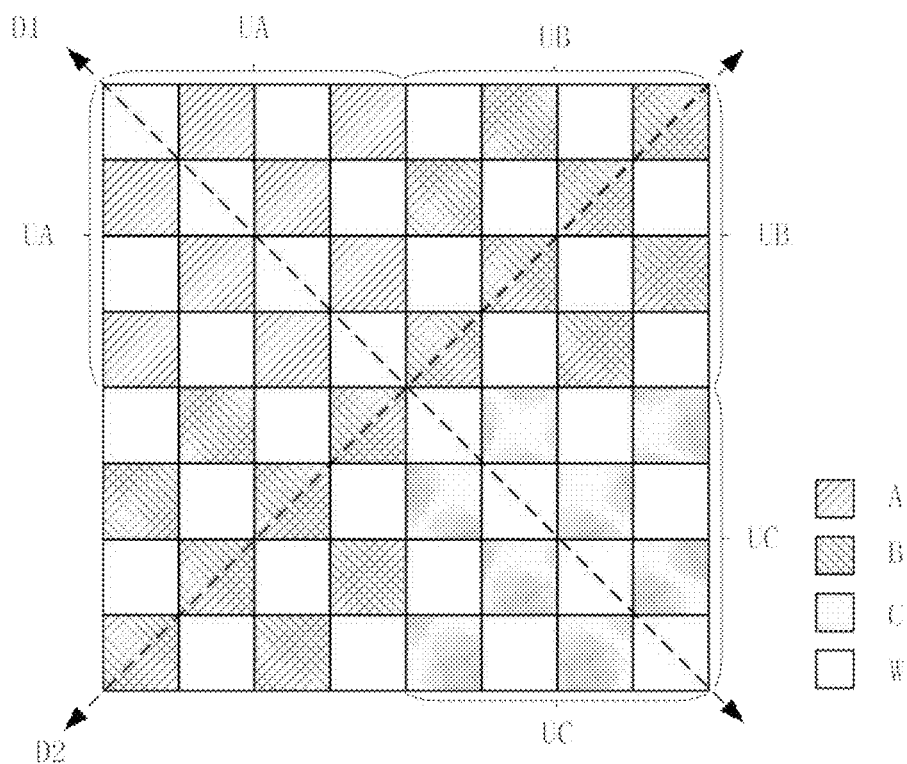
FIG. 8 is a schematic view of an arrangement of a smallest repeating unit in a pixel array according to still another embodiment of the present disclosure.

For example, FIG. 8 is a schematic view of an arrangement of the light-sensitive pixels 110 (shown in FIG. 3) in a smallest repeating unit according to another embodiment of the present disclosure. The smallest repeating unit includes 64 light-sensitive pixels 110 in 8 rows and 8 columns, and each subunit includes 16 light-sensitive pixels 110 in 4 rows and 4 columns. The arrangement is as follows.

| W | A | W | A | W | B | W | B |
|---|---|---|---|---|---|---|---|
| A | W | A | W | B | W | B | W |
| W | A | W | A | W | B | W | B |
| A | W | A | W | B | W | B | W |
| W | B | W | B | W | C | W | C |
| B | W | B | W | C | W | C | W |
| W | B | W | B | W | C | W | C |
| B | W | B | W | C | W | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 8, for each subunit, the panchromatic light-sensitive pixels W and single-color light-sensitive pixels are arranged alternately.

As shown in FIG. 8, the subunits include three categories. A first category subunit UA includes multiple panchromatic light-sensitive pixels W and multiple first color light-sensitive pixels A; a second category subunit UB includes multiple panchromatic light-sensitive pixels W and multiple second color light-sensitive pixels B; and a third category subunit UC includes multiple panchromatic light-sensitive pixels W and multiple third color light-sensitive pixels C. Each smallest repeating unit includes four subunits, one first category subunit UA, two second category subunit UB, and one third category subunit UC, respectively. The first diagonal direction D1 is different from the second diagonal direction D2. For example, the first diagonal direction D1 and the second diagonal direction D2 are perpendicular to each other.

Figure 9:
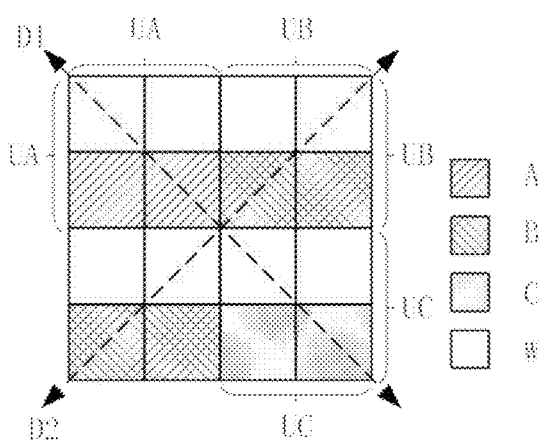
FIG. 9 is a schematic view of an arrangement of a smallest repeating unit in a pixel array according to still another embodiment of the present disclosure.

For example, FIG. 9 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| W | W | W | W |
|---|---|---|---|
| A | A | B | B |
| W | W | W | W |
| B | B | C | C |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 9, in each subunit, the multiple light-sensitive pixels 110 in the same row have the same color channel (i.e., multiple light-sensitive pixels 110 in the same row are light-sensitive pixels 110 of the same category). The same category of light-sensitive pixels 110 include (1) all panchromatic light-sensitive pixels W, (2) all first color light-sensitive pixels A, (3) all second color light-sensitive pixels B, and (4) all third color light-sensitive pixels C.

As shown in FIG. 9, the subunits include three categories. A first category subunit UA includes multiple panchromatic light-sensitive pixels W and multiple first color light-sensitive pixels A; a second category subunit UB includes multiple panchromatic light-sensitive pixels W and multiple second color light-sensitive pixels B; and a third category subunit UC includes multiple panchromatic light-sensitive pixels W and multiple third color light-sensitive pixels C. The light-sensitive pixels 110 having the same color channel may be disposed either in the first row of the subunit or in the second row of the subunit, without limitation herein. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 10:
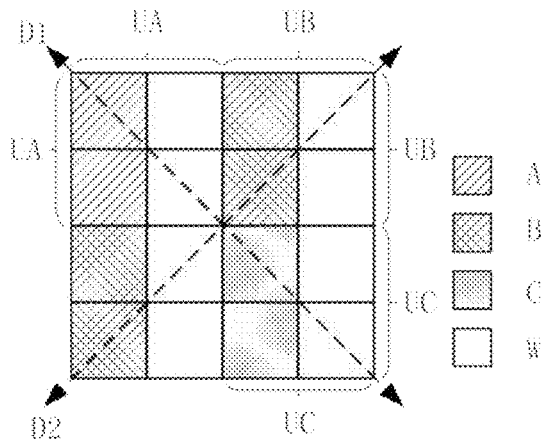
FIG. 10 is a schematic view of an arrangement of a smallest repeating unit in a pixel array according to still another embodiment of the present disclosure.

For example, FIG. 10 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| A | W | B | W |
| A | W | B | W |
| B | W | C | W |
| B | W | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 10, in each subunit, the multiple light-sensitive pixels 110 in the same column have the same color channel (i.e., multiple light-sensitive pixels 110 in the same column are light-sensitive pixels 110 of the same category). The same category of light-sensitive pixels 110 include (1) all panchromatic light-sensitive pixels W, (2) all first color light-sensitive pixels A, (3) all second color light-sensitive pixels B, and (4) all third color light-sensitive pixels C.

As shown in FIG. 10, the subunits include three categories. A first category subunit UA includes multiple panchromatic light-sensitive pixels W and multiple first color light-sensitive pixels A; a second category subunit UB includes multiple panchromatic light-sensitive pixels W and multiple second color light-sensitive pixels B; and a third category subunit UC includes multiple panchromatic light-sensitive pixels W and multiple third color light-sensitive pixels C. The light-sensitive pixels 110 having the same color channel may be disposed either in the first column of the subunit or in the second column of the subunit, without limitation herein. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 11:
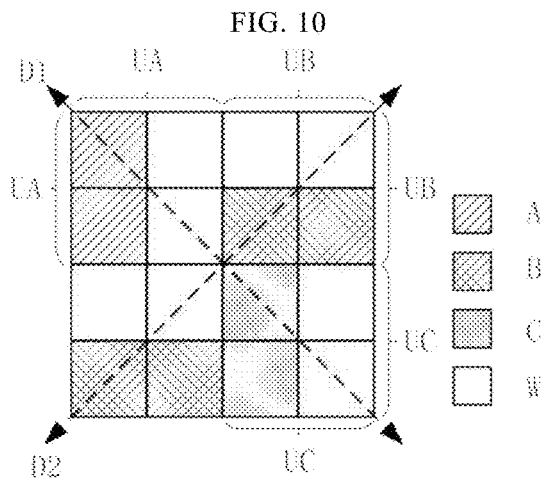
FIG. 11 is a schematic view of an arrangement of a smallest repeating unit in a pixel array according to still another embodiment of the present disclosure.

For example, FIG. 11 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| A | W | W | W |
| A | W | B | B |
| W | W | C | W |
| B | B | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 11, in each subunit, the multiple light-sensitive pixels 110 in the same column or row have the same color channel (i.e., multiple light-sensitive pixels 110 in the same column or row are light-sensitive pixels 110 of the same category). The same category of light-sensitive pixels 110 include (1) all panchromatic light-sensitive pixels W; (2) all first color light-sensitive pixels A; (3) all second color light-sensitive pixels B; and (4) all third color light-sensitive pixels C.

As shown in FIG. 11, the subunits include three categories. A first category subunit UA includes multiple panchromatic light-sensitive pixels W and multiple first color light-sensitive pixels A, with the multiple panchromatic light-sensitive pixels W in the same column and the multiple first color light-sensitive pixels A in the same column; a second category subunit UB includes multiple panchromatic light-sensitive pixels W and multiple second color light-sensitive pixels B, with the multiple panchromatic light-sensitive pixels W in the same row and the multiple first color light-sensitive pixels B in the same row; a third category subunit UC includes multiple panchromatic light-sensitive pixels W and multiple third color light-sensitive pixels C, with the multiple panchromatic light-sensitive pixels W in the same column and the multiple third color light-sensitive pixels C in the same column. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Therefore, as shown in FIG. 11, in the same smallest repeating unit, it may be that the multiple light-sensitive pixels 110 in the same row within part of the subunits are light-sensitive pixels 110 of the same category, and the multiple light-sensitive pixels 110 in the same column within the remaining part of the subunits are light-sensitive pixels 110 of the same category.

Figure 12:
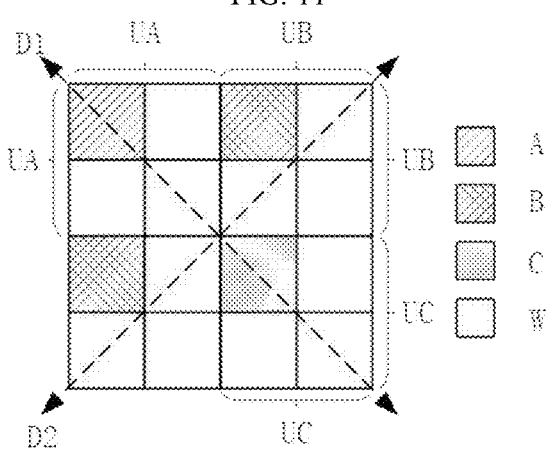
FIG. 12 is a schematic view of an arrangement of a smallest repeating unit in a pixel array according to still another embodiment of the present disclosure.

For example, FIG. 12 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| A | W | B | W |
| W | W | W | W |
| B | W | C | W |
| W | W | W | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 12, each subunit contains only one color light-sensitive pixel among the four light-sensitive pixels 110. In each smallest repeating unit, the color light-sensitive pixel may be disposed at any position of the subunit (e.g., in the upper left corner of the subunit as shown in FIG. 12).

As shown in FIG. 12, the subunits include three categories. A first category subunit UA includes multiple panchromatic light-sensitive pixels W and a first color light-sensitive pixel A; a second category subunit UB includes multiple panchromatic light-sensitive pixels W and a second color light-sensitive pixel B; and a third category subunit UC includes multiple panchromatic light-sensitive pixels W and a third color light-sensitive pixel C. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 13:
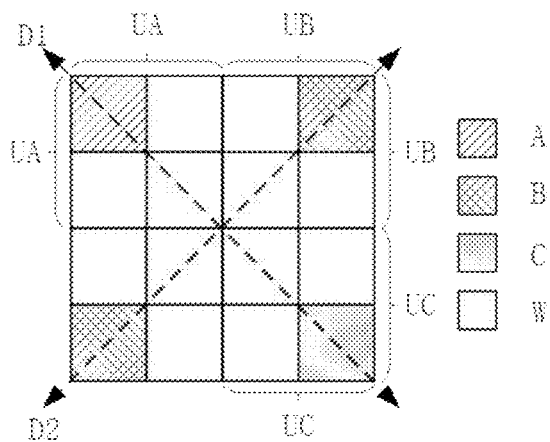
FIG. 13 is a schematic view of an arrangement of a smallest repeating unit in a pixel array according to still another embodiment of the present disclosure.

For example, FIG. 13 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| A | W | W | B |
|---|---|---|---|
| W | W | W | W |
| W | W | W | W |
| B | W | W | C |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 13, each subunit contains only one color light-sensitive pixel among the four light-sensitive pixels 110. In each smallest repeating unit, the color light-sensitive pixel may be disposed at any position of the subunit (e.g., at the upper left corner position, the lower left corner position, the upper right corner position, or the lower right corner position of the subunit as shown in FIG. 12).

As shown in FIG. 13, the subunits include three categories. A first category subunit UA includes multiple panchromatic light-sensitive pixels W and a color first color light-sensitive pixel A; a second category subunit UB includes multiple panchromatic light-sensitive pixels W and a second color light-sensitive pixel B; and a third category subunit UC includes multiple panchromatic light-sensitive pixels W and a third color light-sensitive pixel C. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 14:
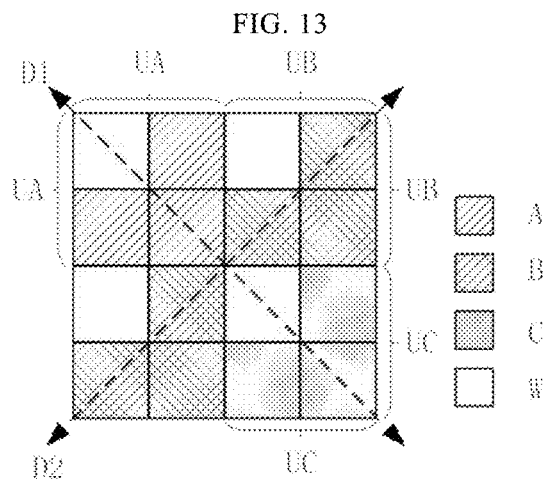
FIG. 14 is a schematic view of an arrangement of a smallest repeating unit in a pixel array according to still another embodiment of the present disclosure.

For example, FIG. 14 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| W | A | W | B |
|---|---|---|---|
| A | A | B | B |
| W | B | W | C |
| B | B | C | C |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 14, each subunit contains only one panchromatic light-sensitive pixel W among the four light-sensitive pixels 110. In each smallest repeating unit, the panchromatic light-sensitive pixel W may be disposed at any position of the subunit (e.g., in the upper left corner of the subunit as shown in FIG. 14).

As shown in FIG. 14, the subunits include three categories. A first category subunit UA includes a panchromatic light-sensitive pixel W and multiple first color light-sensitive pixels A; a second category subunit UB includes a panchromatic light-sensitive pixel W and multiple second color light-sensitive pixels B; and a third category subunit UC includes a panchromatic light-sensitive pixel W and multiple third color light-sensitive pixels C. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 15:
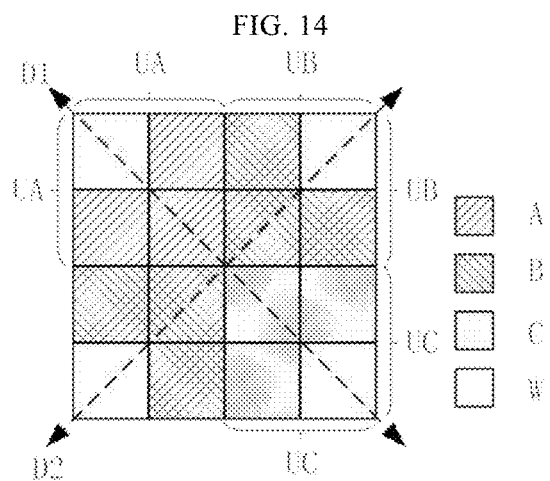
FIG. 15 is a schematic view of an arrangement of a smallest repeating unit in a pixel array according to still another embodiment of the present disclosure.

For example, FIG. 15 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| W | A | B | W |
|---|---|---|---|
| A | A | B | B |
| B | B | C | C |
| W | B | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 15, each subunit contains only one panchromatic light-sensitive pixel W among the four light-sensitive pixels 110. In each smallest repeating unit, the panchromatic light-sensitive pixel W may be disposed at any position of the subunit (e.g., at the top left corner position, the bottom left corner position, the top right corner position, or the bottom right corner position of the subunit as shown in FIG. 15).

As shown in FIG. 15, the subunits include three categories. A first category subunit UA includes a panchromatic light-sensitive pixel W and multiple first color light-sensitive pixels A; a second category subunit UB includes a panchromatic light-sensitive pixel W and multiple second color light-sensitive pixels B; and a third category subunit UC includes a panchromatic light-sensitive pixel W and multiple third color light-sensitive pixels C. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

In some embodiments, the first color light-sensitive pixel A may be a red light-sensitive pixel R; the second color light-sensitive pixel B may be a green light-sensitive pixel G; and the third color light-sensitive pixel C may be a blue light-sensitive pixel Bu, in the smallest repeating unit as shown in FIGS. 5-15.

In some embodiments, the first color light-sensitive pixel A may be a red light-sensitive pixel R; the second color light-sensitive pixel B may be a yellow light-sensitive pixel Y; and the third color light-sensitive pixel C may be a blue light-sensitive pixel Bu, in the smallest repeating unit as shown in FIGS. 5-15.

In some embodiments, the first color light-sensitive pixel A may be a magenta light-sensitive pixel M; the second color light-sensitive pixel B may be a cyan light-sensitive pixel Cy; and the third color light-sensitive pixel C may be a yellow light-sensitive pixel Y, in the smallest repeating unit as shown in FIGS. 5-15.

It is noted that in some embodiments, the response band of the panchromatic light-sensitive pixel W may be a visible light band (e.g., 400 nm-760 nm). For example, the panchromatic light-sensitive pixel W is arranged with an infrared filter to enable filtering of infrared light. In other embodiments, the response band of the panchromatic light-sensitive pixel W is a visible light band and a near-infrared band (e.g., 400 nm-1000 nm), matching the response band of the photoelectric conversion element 1111 (shown in FIG. 4) in the image sensor 10 (shown in FIG. 1). For example, the panchromatic light-sensitive pixel W may be arranged without a filter or with a filter that allows light of all wavelengths to pass, and the response wavelength of the panchromatic light-sensitive pixel W is determined by the response wavelength of the photoelectric conversion element 1111, i.e., the two response wavelengths are matched. The embodiments of the present disclosure include, but are not limited to, the above band range.

Referring to FIG. 16, the present disclosure discloses an image processing method applied to an image sensor 10. The image sensor 10 includes a pixel array 11, the pixel array 11 including multiple subunits, each subunit including at least one panchromatic light-sensitive pixel and at least one color light-sensitive pixel. The color light-sensitive pixel has a narrower spectral response than the panchromatic light-sensitive pixel. The image processing method includes the following operations illustrated at blocks.

At block 01: obtaining a Bayer image and a panchromatic image; where the Bayer image includes multiple first image pixels, a pixel value of each first image pixel being generated by the at least one light-sensitive pixel in a corresponding subunit, the first image pixels being arranged in a Bayer array; the panchromatic image includes multiple second image pixels, a pixel value of each second image pixel being generated by the at least one panchromatic light-sensitive pixel W in a corresponding subunit.

At block 02: obtaining an RGB image after processing the Bayer image with a first processing algorithm and a demosaicing algorithm.

At block 03: obtaining a luminance image after processing the panchromatic image with the first processing algorithm.

At block 04: obtaining a fused RGB image by fusing the RGB image and the luminance image.

At block 05: obtaining a YUV image after processing the fused RGB image with a second processing algorithm.

Referring to FIG. 1 and FIG. 16 together, the image processing method of the present embodiments may be implemented in the camera assembly 100 of the present embodiments. The camera assembly 100 includes an image sensor 10 and a processor 20. The image sensor 10 includes a pixel array 11, and the pixel array 11 includes multiple subunits, each subunit including at least one panchromatic light-sensitive pixel W and at least one color light-sensitive pixel; each color light-sensitive pixel has a narrower spectral response than each panchromatic light-sensitive pixel W. The pixel array 11 is exposed to obtain a Bayer image and a panchromatic image; the Bayer image includes multiple first image pixels, a pixel value of each first image pixel being generated by the at least one light-sensitive pixel in a corresponding subunit, the first image pixels being arranged in a Bayer array; the panchromatic image includes multiple second image pixels, a pixel value of each second image pixel being generated by the at least one panchromatic light-sensitive pixel W in a corresponding subunit. The steps 01, 02, 03, 04, and 05 can be all achieved by the processor. That is, the processor 20 is configured to obtain an RGB image after processing the Bayer image with a first processing algorithm and a demosaicing algorithm, where the Bayer image includes multiple first image pixels, a pixel value of each first image pixel being generated by the at least one light-sensitive pixel in a corresponding subunit, the first image pixels being arranged in a Bayer array, and the panchromatic image includes multiple second image pixels, a pixel value of each second image pixel being generated by the at least one panchromatic light-sensitive pixel W in a corresponding subunit; to obtain a luminance image after processing the panchromatic image with the first processing algorithm; to obtain a fused RGB image by fusing the RGB image and the luminance image; and to obtain a YUV image after processing the fused RGB image with a second processing algorithm.

By processing the Bayer image and the panchromatic image to obtain the RGB image and the luminance image, and fusing the luminance image with the RGB image, the signal-to-noise ratio of the fused RGB image can be improved, resulting in a higher definition of the image.

Figure 17:
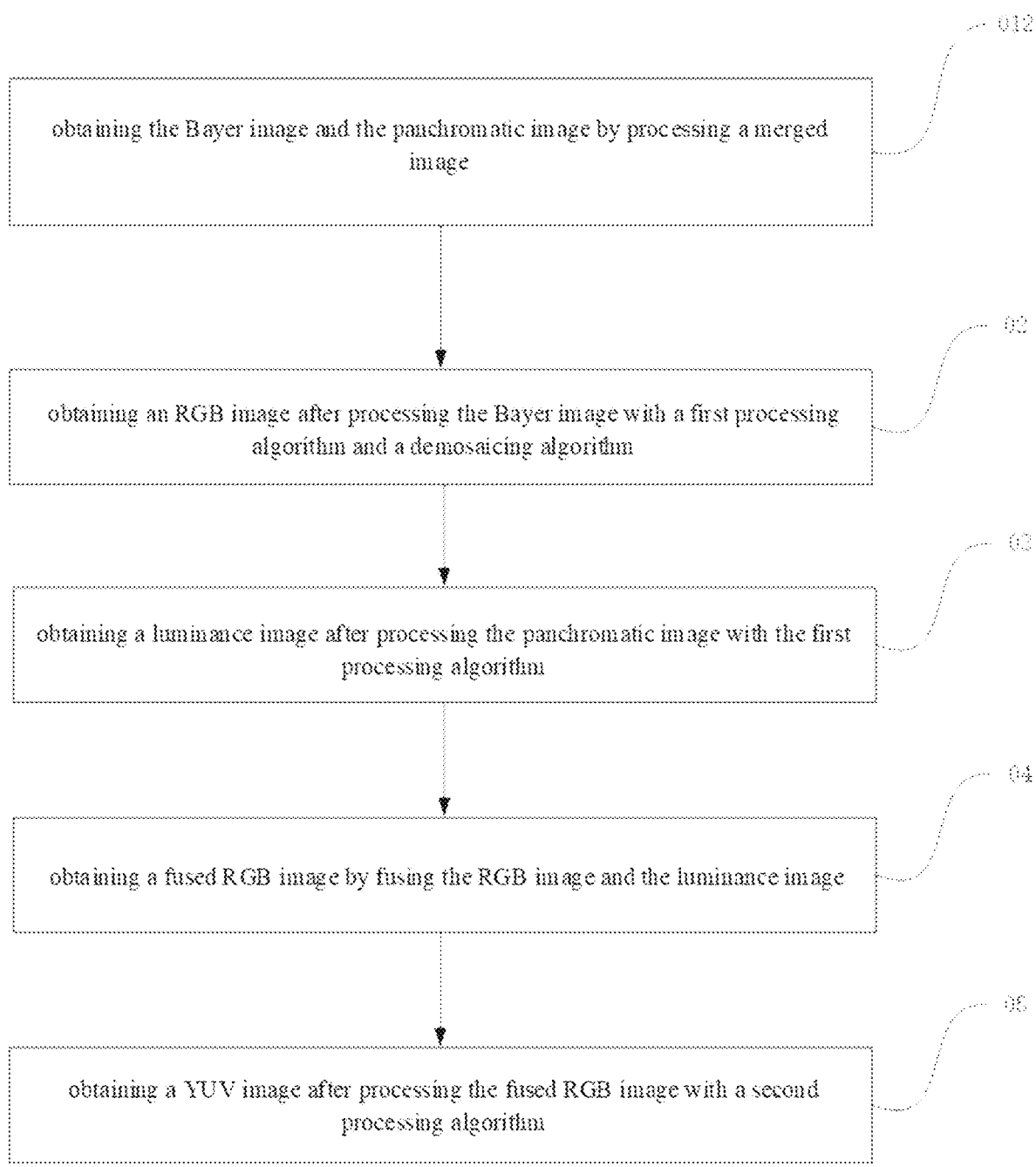
FIG. 17 is a flowchart of an image processing method according to another embodiment of the present disclosure.

Referring to FIG. 17, in some embodiments, the image sensor 10 is configured to output a merged image, and the image processing method includes the following operations.

At block 012: obtaining the Bayer image and the panchromatic image by processing a merged image.

In some implementations, the processor 20 includes a fusion image processor (fusion IP) and step 012 may be implemented by the fusion image processor. That is, the fusion image processor is configured to process the merged image to obtain a Bayer image and a panchromatic image.

Figure 18:
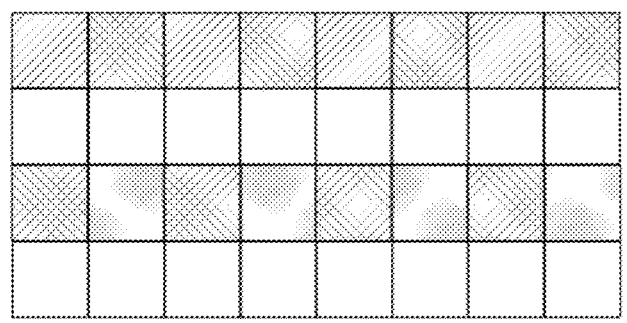
FIG. 18 is a schematic view of a merged image according to an embodiment of the present disclosure.
Figure 19:
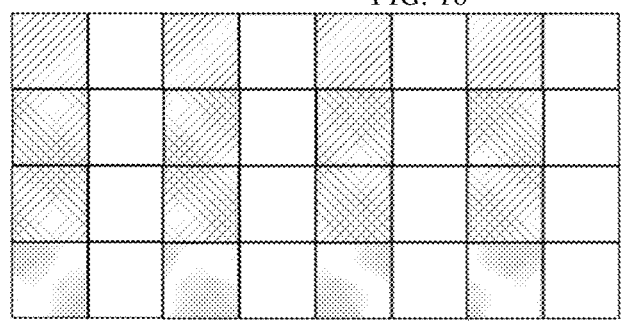
FIG. 19 is a schematic view of a merged image according to another embodiment of the present disclosure.

Referring together to FIG. 18 and FIG. 19, in some embodiments, the image sensor 10 is configured to output a merged image including multiple merged pixels, a pixel value of each merged pixel being generated by at least one color light-sensitive pixel or at least one panchromatic light-sensitive pixel in a corresponding subunit. Specifically, a sum or average value of multiple electrical signals generated by at least one light-sensitive pixel or at least one panchromatic light-sensitive pixel in a subunit after receiving light is taken as a merged image data. The merged image may be a merged image output by color light-sensitive pixels and panchromatic light-sensitive pixels W in separate rows as shown in FIG. 18, or a merged image output by color light-sensitive pixels and panchromatic light-sensitive pixels W in separate columns as shown in FIG. 19. In some embodiments, the merged image shown in FIG. 18 may be extracted from odd rows as a Bayer image and from even rows as a panchromatic image. Since the output merged image includes both color light-sensitive pixels and panchromatic light-sensitive pixels W, it is difficult for existing image processors to process the merged image directly. In the present embodiments, the processor 20 may further include the fusion image processor, and the fusion image processor is configured to process the merged image, thereby splitting the merged image into a Bayer image of a conventional Bayer array and a panchromatic image (grayscale image), which in turn can facilitate the implementation of subsequent image processing algorithms.

In some implementations, the image processing method is implemented through an image pipeline, which is configured to implement the first processing algorithm, the demosaicing algorithm, and the second processing algorithm.

The image pipeline may refer to the related art, for example, it may be the pipeline of the image processor of Qualcomm, or the pipeline of the image processor of MediaTek, etc. However, the image pipeline in the related art cannot process the image output from the image sensor 10 of the present embodiments. Therefore, in the present embodiments, the Bayer image is first processed with the first processing algorithm and the demosaicing algorithm to obtain the RGB image and the luminance image with the first processing algorithm to obtain the luminance image based on the image pipeline in the related art, then the RGB image and the luminance image are guided out of the image pipeline, and the RGB image and the luminance image are fused to obtain the fused RGB image with a high signal-to-noise ratio. The format of the fused RGB image is essentially the same as that of the RGB image, and the fused RGB image can be processed by the image pipeline in the related art. Therefore, the fused RGB image can be retransmitted to the image pipeline for the second processing algorithm. In this way, the image output from the image sensor 10 can be processed based on the image processor and the corresponding image pipeline in the related art, without the need to additionally design and develop a dedicated image pipeline and image processor. The fusion of RGB image and luminance image can be realized by a fusion module (RGBW fusion), and the fusion method may be performed by bilateral filtering of R image, G image, and B image respectively with the luminance image as a reference image to obtain the fused RGB image.

Specifically, the R image, the G image, and the B image may be filtered to obtain a first filtered image of the R image, a first filtered image of the G image, and a first filtered image of the B image. Taking the R image as an example, the R image includes an R image first to-be-filtered image pixel and an R image first to-be-filtered region, and the R image first to-be-filtered image pixel is disposed within the R image first to-be-filtered region. The luminance image includes a first reference image pixel and a first reference region, and the first reference image pixel corresponds to the R image first to-be-filtered image pixel and the first reference region corresponds to the R image first to-be-filtered region. Subsequently, weights of the multiple pixels in the first reference region relative to the first reference image are calculated, and the weights include weights in a spatial domain and weights in a pixel range domain. Then the pixel values of the first to-be-filtered image pixels of the R image are corrected to obtain the first filtered image data of the R image based on the weights of the multiple first image pixels and the pixel values of the pixel points corresponding to the R image first to-be-filtered region. In this way, the first filtered image of the G image and the first filtered image of the B image can be obtained in a manner similar to that of the embodiments. Therefore, it is possible to obtain the fused RGB image by the bilateral filtering processing.

In some embodiments, the image processing method works in a preview mode or a video mode, and the image pipeline includes a front-end image processing module (Image front end, IFE). The front end image processing module is configured to implement the first processing algorithm, the demosaicing algorithm, and the second processing algorithm. The first processing algorithm includes at least one of: Camera Interface (CAMIF), Pedestal Correction, linearization, phase pixel compensation (Position dependent intra prediction combination (PDPC)), channel gain, bad pixel correction/bad cluster correction/Adaptive Bayer Filter (BPC/BCC/ABF), Black Level Correction (BLC), lens roll off, and white balance. The second processing algorithms include at least one of: color correction, global tone mapping, gamma correction, color space transform, and down scaler.

Figure 20:
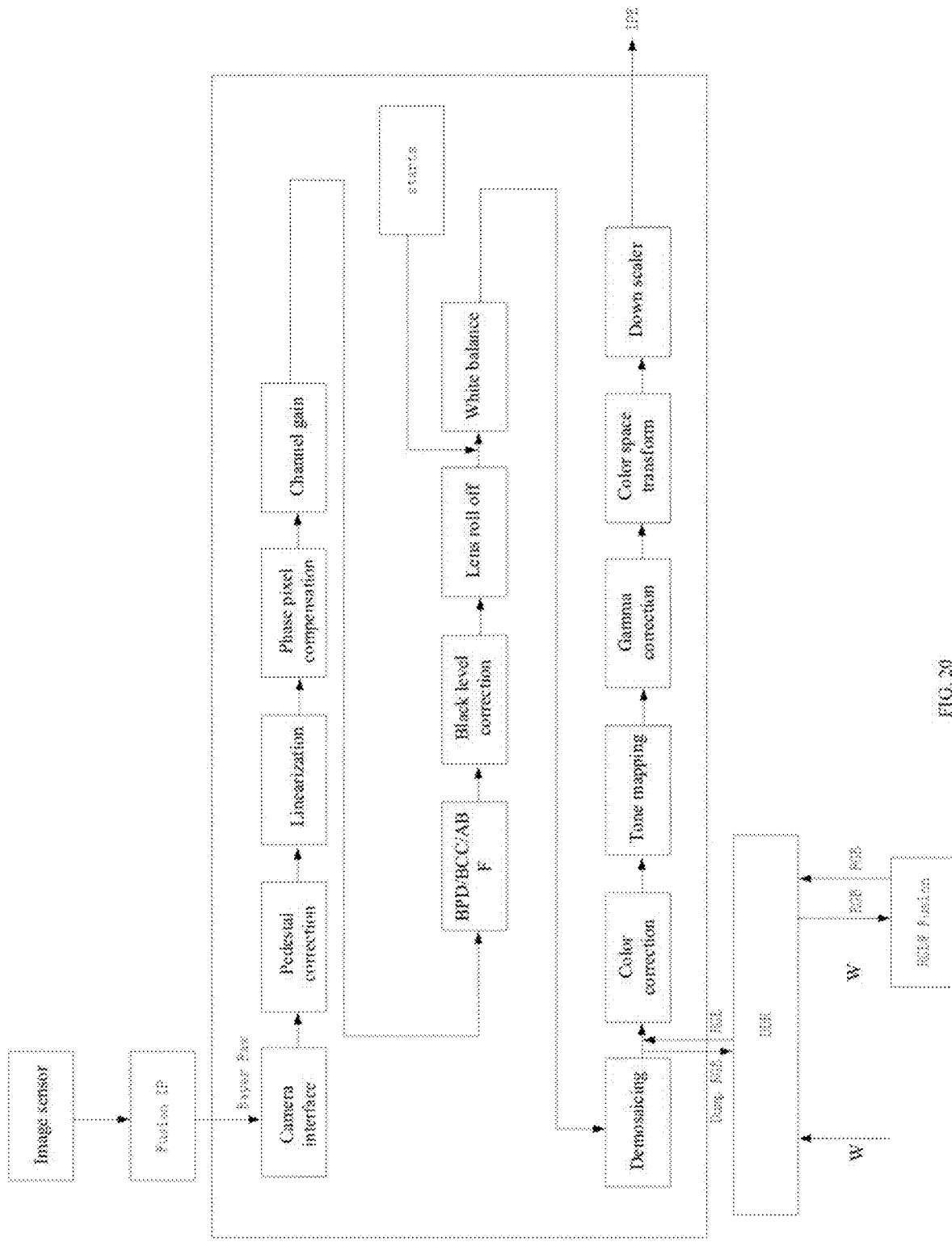
FIG. 20 is a principle schematic view of an image processing method according to an embodiment of the present disclosure.

Referring to FIG. 20, specifically, the image processing method may operate in the preview mode or video mode (i.e., the camera assembly 100 may operate in the preview mode or video mode), and since the image sensor 10 needs to capture images at a higher frame rate during the preview mode or video mode, the processor 20 is required to process images at a faster rate. Therefore, to ensure that the processing speed of images meets the frame rate requirement, the front-end image processing module may be applied to process the images.

The first processing algorithm in the front-end image processing module includes at least one of CAMIF, pedestal correction, linearization, PDPC, channel gains, BPC/BCC/ABF, lens roll off, and white balance. The camera interface may be further configured to synchronize synchronization signals involved in the process of sending data from the image sensor 10. The camera interface further has image extraction and image mirroring capabilities. The camera interface can convert a raw image into a raw dump Bayer raw image. Considering the signal-to-noise ratio of the image output by the image sensor 10, the image sensor 10 outputs an image with a pedestal added, which is required to be subtracted when processing the image, i.e., pedestal correction is performed. For the nonlinearity of the image sensor 10 (e.g., photoelectric conversion element), the image may be linearized, and the linearization is implemented, for example, by curve fitting, neural networks, and other methods. The principle of PDPC is to combine an unfiltered boundary reference pixel and a phase pixel compensation value obtained from the filtered reference pixel to obtain a final phase pixel compensation value. The channel gain allows the amplification of each channel of the image, thereby making the data of each channel more accurate. The bad pixel correction refers to bad pixel compensation, which can be applied to obtain the pixel value corresponding to a pixel in the image sensor 10 when that pixel is not working properly. The bad cluster correction refers to bad cluster compensation to correct bad dots. The Bayer domain noise reduction module refers to the Adaptive Bayer filter, which enables the image to be processed by noise reduction without blunting the edges during the noise reduction process. The circuitry of the image sensor 10 itself has a dark current, which causes the pixels to have a certain output voltage even when there is no light exposure. Therefore, the effect of the dark current needs to be subtracted, i.e., black level correction. Due to the limitation of the light intake of the lens, the imaging of the lens will have dark corners, for example, the light transmission at the edge of the lens is only 40% and below of the light transmission at the center of the lens. Therefore, the lens attenuation (lens attenuation correction) may be applied to enhance the light transmission at the edge of the lens to 90% of the light transmission at the center of the lens. To improve the color accuracy of the image, white balance (WB) processing may also be applied to the image. The white balance processing algorithms include grayscale world method, specular method, color temperature estimation method, etc.

The demosaicing algorithm can interpolate the Bayer image of the Bayer array into an RGB image, where the RGB image may be three frames, i.e., the R image, G image, and B image obtained after interpolation, respectively.

The second processing algorithm in the front-end image processing module includes at least one of color correction, tone mapping, gamma correction, color space transform, and down scaler. The color saturation of the image after using color correction is more pronounced and more in line with the human eye senses. The tone mapping is the transformation of the image color, which aims to adjust the gray scale of the image, making the processed image look more comfortable and better express the information and features in the image, and the tone mapping process can output raw dump RGB images. The gamma correction can make the image look more in line with the characteristics of the human eye. The gamma correction formula is, for example, $Out = In^{gamma}$ or $Out = In^{1/gamma}$, where In indicates the input image and Out indicates the output image. The color space transform converts RGB images to YUV images. The size of the image can be reduced by down scaler.

The IFE may further include a camera serial interface decoder module (CSID), which is configured to unpack the MIPI data and thus facilitate subsequent processing.

Referring to FIG. 21, in some embodiments, the image processing method works in a photo mode, and the image pipeline includes a Bayer processing segment (BPS). The Bayer processing module is configured to implement the first processing algorithm, the demosaicing algorithm, and the second processing algorithm. The first processing algorithm includes at least one of: pedestal correction, linearization, bad pixel correction/bad cluster correction/phase pixel correction, channel gain, green imbalance correction, Bayer domain noise reduction module (Adaptive Bayer Filter), BLC, lens roll off, and white balance. The second processing algorithm includes at least one of color correction, tone mapping, gamma correction, color space transform, hybrid noise reduction, and down scaler.

Specifically, the image processing method can work in the photo mode (i.e., the camera assembly 100 can work in the photo mode), and since the processor 20 is required to process the image accordingly to improve the imaging quality when in the photo mode, the Bayer processing module may be applied to process the image to ensure clarity and accuracy.

The first processing algorithm of the Bayer processing module includes at least one of pedestal correction, linearization, bad pixel correction/bad cluster correction/phase pixel correction, channel gain, green imbalance correction, Bayer domain noise reduction module, BLC, lens roll off, and white balance. The explanatory description of pedestal correction, linearization, bad pixel correction/bad cluster correction/phase pixel correction, channel gain, Bayer domain noise reduction module, BLC, lens roll off, and white balance can be referred to the above embodiments. The energy obtained or the data output by the Gr and Gb channels in the image sensor 10 may not be the same, which may be caused by the difference in the semiconductor manufacturing process of the Gr and Gb channels on the one hand, and the presence of microlenses on the other hand, especially in the edge area of the image sensor 10, where the Gr and Gb channels receive different light energy because of the angular difference, and thus require green imbalance correction.

Figure 22:
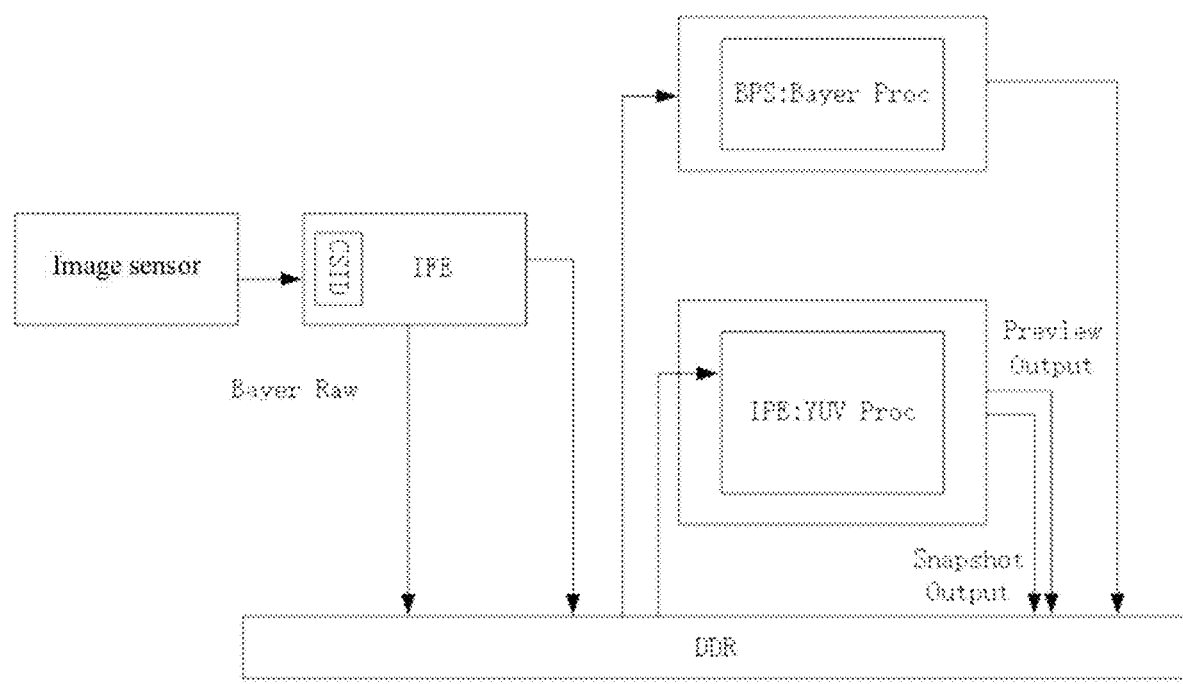
FIG. 22 is a principle schematic view of an image processing method according to further another embodiment of the present disclosure.

Referring to FIG. 22, the CSID may be applied to unpack the MIPI data before the image is transferred to the Bayer processing module.

Figure 23:
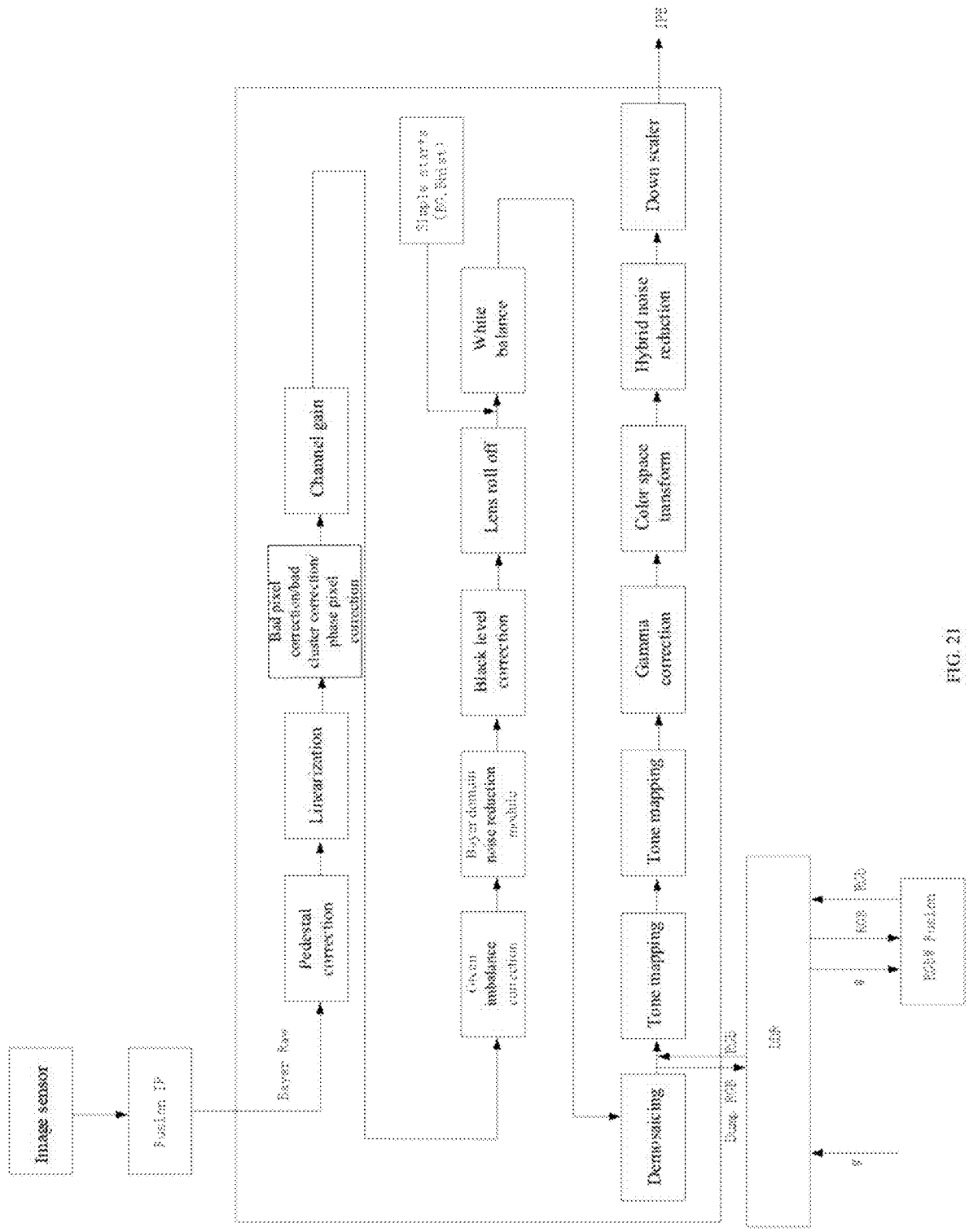
FIG. 23 is a flowchart of an image processing method according to an embodiment of the present disclosure.

Referring to FIG. 23, in some embodiments, the image processing method further includes the following operations.

At block 06: performing image post-processing on the YUV image.

In some embodiments, step 06 may be implemented by the processor 20, i.e., the processor 20 is configured to perform image post-processing on the YUV image.

Specifically, after performing the first processing algorithm, the demosaicing algorithm, and the second processing algorithm of the front-end image processing module or the Bayer processing module on the image, the image post-processing algorithm may be performed on the image, thereby making the output image more accurate.

In some implementations, the image processing method is implemented through an image pipeline. The image pipeline includes an image processing engine (IPE), which is configured to implement image post-processing algorithms, including at least one of: image correction and adjustment (ICA), advanced noise reduction, temporal filter, Chromatic Aberration Correction (CAC), color space transform, local tone mapping, color correction, gamma correction, 2D Look-Up Table (2D LUT), color adjustment and chroma enhancement (CV&Chroma enhancement), chroma suppression, Adaptive Spatial Filter (ASF), up scaler, grain adder, and down scaler.

In this way, the image post-processing on the YUV image may be performed based on the image processors and image pipeline in the related art, without the need for additional design and development of dedicated image pipelines and image processors.

Figure 24:
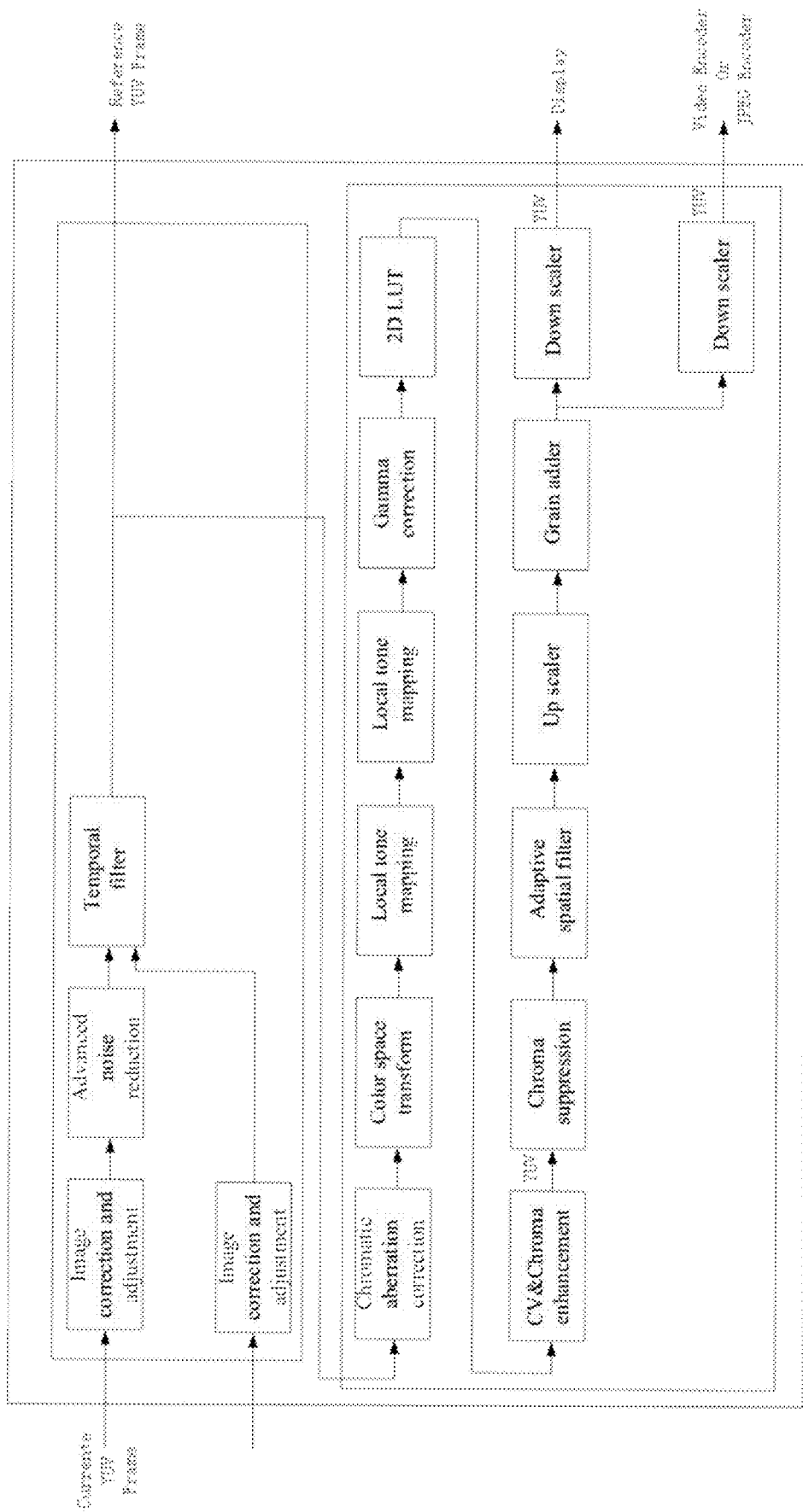
FIG. 24 is a principle schematic view of an image processing method according to an embodiment of the present disclosure.

Referring to FIG. 24, specifically, the image processing engine may include a noise processing section and a post-processing section. The image post-processing algorithms include at least one of: ICA, advanced noise reduction, temporal filter, CAC, color space transform, local tone mapping, color correction, gamma correction, 2D LUT, CV&Chroma enhancement, chroma suppression, ASF, up scaler, grain adder, and down scaler. The ICA, advanced noise reduction, and temporal filter may be implemented by the noise processing section. The CAC, color space transform, local tone mapping, color correction, gamma correction, 2D LUT, CV&Chroma enhancement, chroma suppression, ASF, up scaler, grain adder, and down scaler may be implemented by the post-processing section.

The ICA refers to the restorative processing of distorted images. The ICA is divided into two main categories: geometric correction and grayscale correction. The ICA can be done in three aspects: level, color, and sharpness. The ICA can be performed twice. The ICA may include a first ICA and a second ICA, where the first ICA is configured to process the current YUV frame and the second ICA is configured to process the reference YUV frame. The current YUV frame, after being processed by the first ICA, may be processed with advanced noise reduction and temporal filter. The advanced noise reduction can reduce the noise of the image, thereby improving the signal-to-noise ratio of the image. The temporal filter is configured to smooth the image. The CAC is configured to correct the color of the image such that the color of the image becomes accurate. The local tone mapping, refers to a method where the mapped grayscale values of pixels may be different depending on their location, and the mapping results of pixel points are influenced by other factors. The 2D LUT is configured to color restore the grayscale mode of the screen, and also to establish a correspondence between two sets of data, which can be used for color space transform, CCM, luminance mapping, etc. The CV&Chroma enhancement is configured to enhance the chromaticity of the image. The chroma suppression is configured to improve the color effect of translucent areas in the foreground signal, thereby restoring the original color of objects in the foreground (instead of being in a gray or translucent state). Specifically, chroma enhancement enhances color saturation while keeping luminance constant, and chroma suppression suppresses chroma in certain luminance ranges. The ASF is an adaptive spatial filter that filters the image and is configured to enhance sharpness. The up scaler is configured to increase the size of the image and enhance the resolution of the image. The grain adder is a texture increaser, which adds fineness to the image to make the texture information of the image clearer. The down scalar is configured to decrease the size of the image and decrease the resolution of the image. The image obtained after the image post-processing algorithm may be transferred to the display for display or to the video encoder or JPEG encoder for codec processing.

Referring to FIG. 25, in some embodiments, the image processing method includes the following operations.

At block 07: storing the RGB image, the luminance image, and the fused RGB image.

In some implementations, step 07 may be implemented by the processor 20, i.e., the processor 20 is configured to store the RGB image, the luminance image, and the fused RGB image.

Specifically, after processing the RGB image, luminance image, and fused RGB image, the images may be stored in a storage element (e.g., double-rate synchronous dynamic random memory, DDR) such that they can be quickly read from the storage element when they are subsequently needed.

Figure 26:
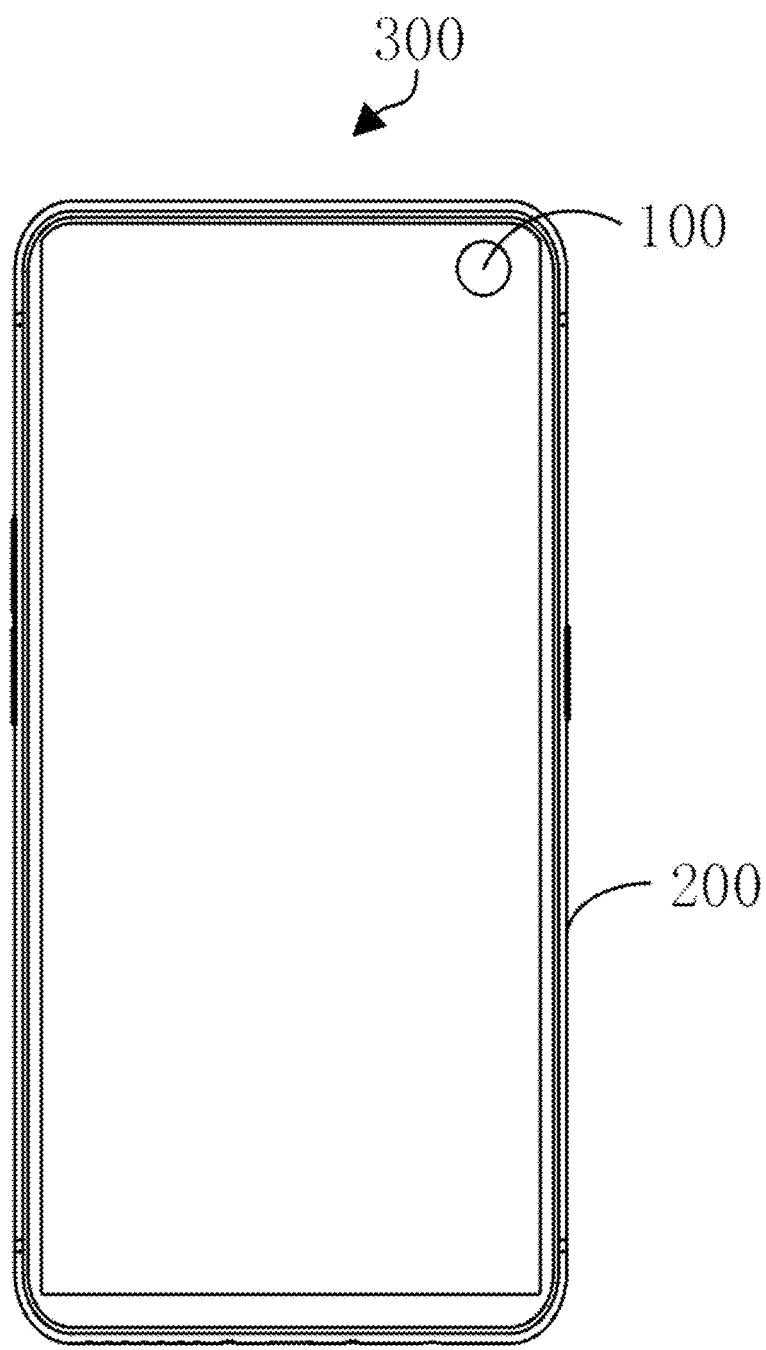
FIG. 26 is a structural schematic view of a mobile terminal according to an embodiment of the present disclosure.

Referring to FIG. 26, the present disclosure further provides a mobile terminal 300. The mobile terminal 300 includes a camera assembly 100 of any of the above embodiments and a housing 200, the camera assembly 100 being arranged on the housing 200. In some embodiments, the housing 200 is defines a mounting hole, and the camera assembly 100 may be arranged in the mounting hole.

The mobile terminal 300 may be mobile phone, tablet, laptop, smart wearable device (e.g., smart watch, smart bracelet, smart glasses, smart helmet), drone, head-up display device, etc., without restriction herein.

The mobile terminal 300 of the embodiments of the present disclosure is able to improve the signal-to-noise ratio of the fused RGB image by processing the Bayer image and the panchromatic image to obtain the RGB image and the luminance image and fusing the luminance image with the RGB image, thereby making the image clearer.

In the description of this specification, reference to the terms "an embodiment", "some embodiments", "schematic embodiment", "example", "specific example", or "some examples" means that the specific features, structures, materials, or characteristics described in connection with the embodiment or example are included in at least one embodiment or example of the present disclosure. In this specification, the schematic representation of the above terms does not necessarily refer to the same embodiment or example. Moreover, the specific features, structures, materials, or characteristics described may be combined in a suitable manner in any one or more of the embodiments or examples. In addition, without contradicting each other, those skilled in the art may combine different embodiments or examples described in this specification and the features of the different embodiments or examples.

Any process or method description in the flowchart or otherwise described herein may be understood to represent a module, fragment, or portion of code including one or more executable instructions for implementing steps of a particular logical function or process, and the scope of the embodiments of the present disclosure includes additional implementations in which the functions may be performed not in the order shown or discussed, including according to the functions involved in a substantially simultaneous manner or in the reverse order, as should be understood by those skilled in the art to which the embodiments of the present disclosure belong.

Although the embodiments of the present disclosure have been shown and described above, it is understood that the above embodiments are exemplary and are not to be construed as limiting the present disclosure, and that variations, modifications, replacements, and variants of the above embodiments may be made by those skilled in the art within the scope of the present disclosure.

What is claimed is:

1. An image processing method applied to an image sensor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel; the method comprises:

obtaining a Bayer image and a panchromatic image; wherein the Bayer image comprises a plurality of first image pixels, a pixel value of each first image pixel being generated by the at least one light-sensitive pixel in a corresponding subunit, the plurality of first image pixels being arranged in a Bayer array; the panchromatic image comprises a plurality of second image pixels, a pixel value of each second image pixel being generated by the at least one panchromatic light-sensitive pixel in a corresponding subunit;

obtaining an RGB image after processing the Bayer image with a first processing algorithm and a demosaicing algorithm;

obtaining a luminance image after processing the panchromatic image with the first processing algorithm;

obtaining a fused RGB image by fusing the RGB image and the luminance image; and obtaining a YUV image after processing the fused RGB image with a second processing algorithm.

2. The method according to claim 1, wherein the image sensor is configured to output a merged image, the merged image comprising a plurality of merged pixels, a pixel value of each merged pixel being generated by at least one color light-sensitive pixel or at least one panchromatic light-sensitive pixel in a corresponding subunit; the method further comprises:

obtaining the Bayer image and the panchromatic image by processing the merged image.

3. The method according to claim 2, wherein a sum or average value of multiple electrical signals generated by at least one light-sensitive pixel or at least one panchromatic light-sensitive pixel in a corresponding subunit after receiving light is taken as a merged image data.

4. The method according to claim 1, wherein the method is implemented through an image pipeline, which is configured to implement the first processing algorithm, the demosaicing algorithm, and the second processing algorithm.

5. The method according to claim 4, configured to work in a preview mode or a video mode; wherein the image pipeline comprises an image front end (IFE) configured to implement the first processing algorithm, the demosaicing algorithm, and the second processing algorithm; the first processing algorithm comprises at least one of: Camera Interface (CAMIF), Pedestal Correction, linearization, phase pixel compensation (PDPC), channel gain, bad pixel correction/bad cluster correction/Adaptive Bayer Filter (BPC/BCC/ABF), Black Level Correction (BLC), lens roll off, and white balance.

6. The method according to claim 4, configured to work in a preview mode or a video mode; wherein the image pipeline comprises an image front end (IFE) configured to implement the first processing algorithm, the demosaicing algorithm, and the second processing algorithm; the second processing algorithms comprises at least one of: color correction, global tone mapping, gamma correction, color space transform, and down scaler.

7. The method according to claim 4, configured to work in a photo mode; wherein the image pipeline comprises a Bayer processing segment (BPS) configured to implement the first processing algorithm, the demosaicing algorithm, and the second processing algorithm; the first processing algorithm comprises at least one of: pedestal correction, linearization, bad pixel correction/bad cluster correction/phase pixel correction, channel gain, green imbalance correction, Bayer domain noise reduction module, Black Level Correction (BLC), lens roll off, and white balance; the second processing algorithm comprises at least one of: color correction, tone mapping, gamma correction, color space transform, hybrid noise reduction, and down scaler.

8. The method according to claim 1, further comprising: processing the YUV image with an image post-processing algorithm.

9. The method according to claim 8, wherein the image processing method is implemented through an image pipeline; the image pipeline comprises an image processing engine (IPE) configured to implement the image post-processing algorithm.

10. The method according to claim 9, wherein the image post-processing algorithm comprises at least one of: image correction and adjustment (ICA), advanced noise reduction, temporal filter, Chromatic Aberration Correction (CAC), color space transform, local tone mapping, color correction, gamma correction, 2D Look-Up Table (2D LUT), color adjustment and chroma enhancement (CV&Chroma enhancement), chroma suppression, Adaptive Spatial Filter (ASF), up scaler, grain adder, and down scaler.

11. The method according to claim 1, further comprising:
storing the RGB image, the luminance image, and the fused RGB image.

12. A camera assembly, comprising an image sensor and a processor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel;

wherein the processor is configured to perform an image processing method comprising:

obtaining a Bayer image and a panchromatic image; wherein the Bayer image comprises a plurality of first image pixels, a pixel value of each first image pixel being generated by the at least one light-sensitive pixel in a corresponding subunit, the plurality of first image pixels being arranged in a Bayer array; the panchromatic image comprises a plurality of second image pixels, a pixel value of each second image pixel being generated by the at least one panchromatic light-sensitive pixel in a corresponding subunit;

obtaining an RGB image after processing the Bayer image with a first processing algorithm and a demosaicing algorithm;

obtaining a luminance image after processing the panchromatic image with the first processing algorithm;

obtaining a fused RGB image by fusing the RGB image and the luminance image; and obtaining a YUV image after processing the fused RGB image with a second processing algorithm.

13. The camera assembly according to claim 12, wherein the processor is configured to output a merged image, the merged image comprising a plurality of merged pixels, a pixel value of each merged pixel being generated by at least one color light-sensitive pixel or at least one panchromatic light-sensitive pixel in a corresponding subunit; the image processing method further comprises:

obtaining the Bayer image and the panchromatic image by processing the merged image.

14. The camera assembly according to claim 12, wherein the image processing method is implemented through an image pipeline, which is configured to implement the first processing algorithm, the demosaicing algorithm, and the second processing algorithm.

15. The camera assembly according to claim 14, wherein the image processing method is configured to work in a preview mode or a video mode; the image pipeline comprises an image front end (IFE) configured to implement the first processing algorithm, the demosaicing algorithm, and the second processing algorithm; the first processing algorithm comprises at least one of: Camera Interface (CAMIF), Pedestal Correction, linearization, phase pixel compensation (PDPC), channel gain, bad pixel correction/bad cluster correction/Adaptive Bayer Filter (BPC/BCC/ABF), Black Level Correction (BLC), lens roll off, and white balance.

16. The camera assembly according to claim 14, wherein the image processing method is configured to work in a preview mode or a video mode; the image pipeline comprises an image front end (IFE) configured to implement the first processing algorithm, the demosaicing algorithm, and the second processing algorithm; the second processing algorithms comprises at least one of: color correction, global tone mapping, gamma correction, color space transform, and down scaler.

17. The camera assembly according to claim 14, wherein the image processing method is configured to work in a photo mode; the image pipeline comprises a Bayer processing segment (BPS) configured to implement the first processing algorithm, the demosaicing algorithm, and the second processing algorithm;

the first processing algorithm comprises at least one of: pedestal correction, linearization, bad pixel correction/bad cluster correction/phase pixel correction, channel gain, green imbalance correction, Bayer domain noise reduction module, Black Level Correction (BLC), lens roll off, and white balance; the second processing algorithm comprises at least one of: color correction, tone mapping, gamma correction, color space transform, hybrid noise reduction, and down scaler.

18. The camera assembly according to claim 12, wherein the image processing method further comprises:

processing the YUV image with an image post-processing algorithm.

19. The camera assembly according to claim 12, wherein the image processing method further comprises:

storing the RGB image, the luminance image, and the fused RGB image.

20. A mobile terminal, comprising:

a camera assembly; and a housing, wherein the camera assembly is arranged on the housing;

wherein the camera assembly comprises an image sensor and a processor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel;

wherein the processor is configured to perform an image processing method comprising:

obtaining a Bayer image and a panchromatic image; wherein the Bayer image comprises a plurality of first image pixels, a pixel value of each first image pixel being generated by the at least one light-sensitive pixel in a corresponding subunit, the plurality of first image pixels being arranged in a Bayer array; the panchromatic image comprises a plurality of second image pixels, a pixel value of each second image pixel being generated by the at least one panchromatic light-sensitive pixel in a corresponding subunit;

obtaining an RGB image after processing the Bayer image with a first processing algorithm and a demosaicing algorithm;

obtaining a luminance image after processing the panchromatic image with the first processing algorithm;

obtaining a fused RGB image by fusing the RGB image and the luminance image; and obtaining a YUV image after processing the fused RGB image with a second processing algorithm.

* * * * *